Figure 5:
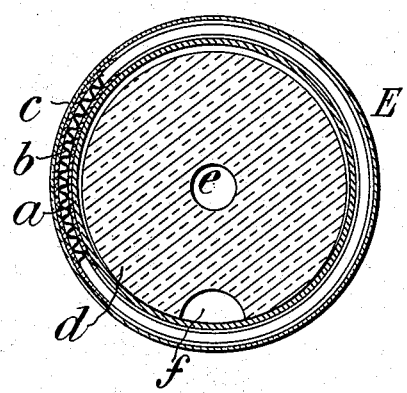

No. 867,266. PATENTED OCT. 1, 1907.
E. E. GOLD.
HEATING APPARATUS FOR FRUIT CARS.
APPLICATION FILED MAR. 12, 1906.
2 SHEETS—SHEET 1.
FIG. 1.
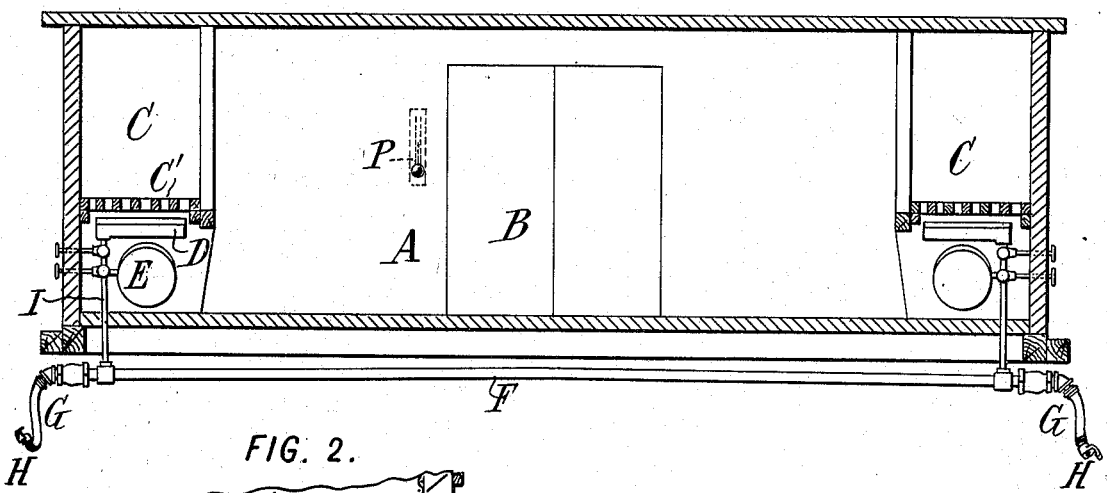
FIG. 2.
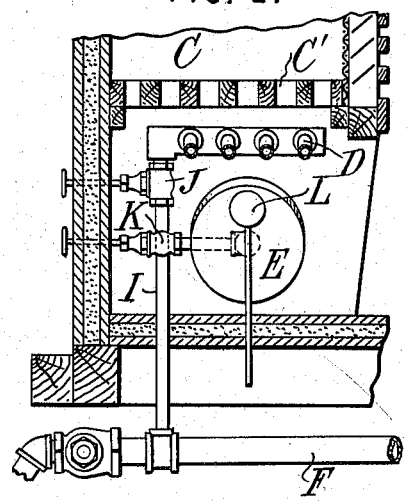
FIG. 3.
FIG. 4.
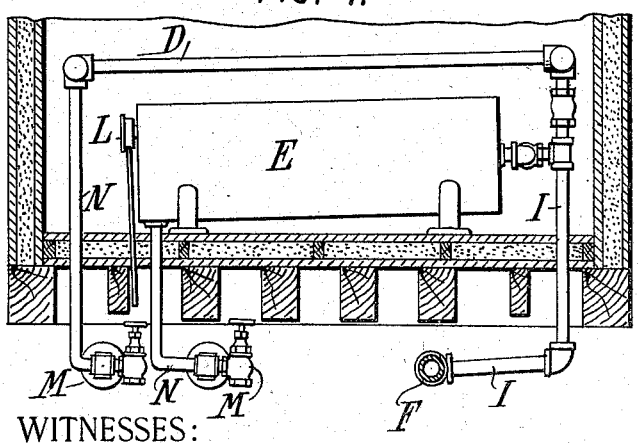
WITNESSES:
René Bruine
J. J. Wallace
INVENTOR:
Edward E. Gold,
By Attorneys,
Arthur E. Shaw & Urina No. 867,266. PATENTED OCT. 1, 1907.
E. E. GOLD.
HEATING APPARATUS FOR FRUIT CARS.
APPLICATION FILED MAR. 12, 1906.

2 SHEETS—SHEET 2.

WITNESSES:
Rene Bruine
T. J. Wallace

INVENTOR:
Edward E. Gold,
By Attorneys,
Arthur E. Fraser & Usina

UNITED STATES PATENT OFFICE.

EDWARD E. GOLD, OF NEW YORK, N. Y.

HEATING APPARATUS FOR FRUIT-CARS.

No. 867,266.          Specification of Letters Patent.          Patented Oct. 1, 1907.

Application filed March 12, 1906. Serial No. 305,563.

*To all whom it may concern:*

Be it known that I, EDWARD E. GOLD, a citizen of the United States, residing in the borough of Manhattan, city, county, and State of New York, have invented certain new and useful Improvements in Heating Apparatus for Fruit-Cars, of which the following is a specification.

This invention provides means for warming so-called refrigerator cars, such as are used for carrying fruit and other perishable freight.

The problem of carrying in cold weather fruit and other freight liable to injury by freezing, has proved in practice to involve serious difficulty. The attempts heretofore made to warm the cars carrying such freight have been mostly abortive, or such complete failures that, with the rapid increase in the transportation of such freight, the annual losses to railroads and shippers by the freezing of fruit and other perishable freight during transit, have reached a tremendous aggregate.

The conditions existing in the heating of cars for fruit and other perishable freight, differ so radically from those involved in the heating of passenger cars, that the successful experience in heating the latter by steam, has been found to afford no guide to success with the former. Passenger cars require to be heated to 70 degrees or upward with a frequent circulation of air through the opening of doors or ventilators; they require practically constant heating, and are nearly always connected with the locomotive, so that they can be supplied continuously with live steam, and passenger locomotives are designed to supply steam continuously or practically so in sufficient quantity to keep the cars of a train heated. No serious consequences ensue from the overheating of passenger cars. Freight cars for fruit or the like require a much lower temperature, preferably about 40 degrees, with a variable maximum which should in any case not exceed 60 degrees; they have non-conducting walls, and are tightly closed to prevent currents of air and so far as possible chilling by external cold; they are most commonly hauled by freight locomotives, which are unequipped with steam supply connections, or if so equipped are incapable of affording a substantially continuous supply of steam for heating, but could supply such steam only under favorable conditions such as when running down grade. The application of the ordinary passenger car heating apparatus to freight cars, would result in overheating the front cars or those nearest the locomotive so as to spoil their contents, while commonly failing to heat the rear cars of a long train so that their contents would be liable to freeze.

The heating of freight cars containing fruit or the like must be performed under the control of a watchful operator, who will stop the supply of heat to each car as soon as it reaches or approaches the prescribed maximum temperature, to thereby prevent overheating. Such heating can best be performed when the train is standing still, and therefore the heating is best made intermittent, the cars being initially warmed under suitable control to the maximum temperature while stationary, and the train being then run a suitable distance over the line, during which the contents of the cars gradually cool off, and before too low a temperature has been reached the train is stopped and again the cars are supplied with heat. This general system has been successfully practiced, although at great expense, by providing heated buildings or shelters along the line at suitable intervals, into which the trains can be run and their contents warmed up to the requisite temperature, either from the heat within the building or by recourse to special heaters such as portable stoves or salamanders. The cost of providing and maintaining such buildings, however, is almost prohibitive, and there is serious risk that an unexpected cold wave may lower the temperature of the cars *en route* to below the danger point, thereby causing loss. The desirability of providing a source of heat in each car is manifest, and for this purpose separate stoves in the nature of oil, gas or coal stoves have been tried, but these have been found to be unreliable, since they are isolated from human control and are liable to heat the car too much or too little, and further are found to distribute the heat unequally, overheating the portions of fruit nearest to them. Prior to my invention the economical, safe, and equable heating of cars for transporting fruit or perishable freight, has remained an unsolved problem.

My invention provides a steam heating system adapted to the peculiar requirements of fruit car heating. I provide each car with one or more steam radiators adapted initially to rapidly heat up the car, and adapted secondarily to very slowly radiate heat into the car. This enables the ideal intermittent heating of the cars under intelligent control to be realized, with such retardation of the subsequent cooling off of the car that the periods of heating up may be rendered much less frequent than has heretofore been necessary. The radiators by which the car is slowly warmed after being initially heated, are so adapted and proportioned relative to the capacity of the car, that in the mildest winter weather when any artificial heating is required, that is to say, in weather approximating the freezing point, their rate of heat radiation shall approximate but not exceed the normal rate of radiation from the car during transit, in order that in such weather the heat given out by these radiators shall not raise the temperature of the car above that initially determined by the attendant. It results from this that in normal winter weather, or for example at temperatures approximating 15 degrees to 20 degrees Fahrenheit, the rate of feeding heat into the car by the radiators shall be somewhat less than the rate at which the car loses heat by exterior radiation, with the result that during transit the contents of the car will slowly cool at a rate of approximately one-half to one-quarter the rate at which a suitably constructed refrigerator car would cool if unprovided with internal heating means, so that the train may safely travel from two to four times as far before again stopping to re-warm the cars. These results are attained according to my invention by a modification of the steam storage heaters heretofore proposed for passenger cars and used to a limited extent. Such storage heaters have heretofore been designed and proportioned for the storage of a relatively small quantity of heat and the radiation thereof with considerable rapidity, in order that when the passenger car was temporarily side-tracked or otherwise separated from its locomotive or other source of steam, the storage radiators would discharge heat into it with an approximation to the same rate of radiation as in normal heating, in order to prevent the cars during a short time, ordinarily not exceeding from 30 minutes to one hour, from becoming uncomfortably cool. This involved the use of long and slender heaters, with the inclosed heating medium in good conductive contact with the casing, and with such casing naked or uncovered to afford ready conduction and radiation of heat. My invention requires a radically different form and construction of storage heaters, that is to say, they must be of greatly increased capacity such as to store a sufficient quantity of heat to be radiated during a long period of time, in practice from 12 to 24 hours; they should be made of large diameter and relatively short, in order to greatly increase their capacity and diminish their radiating surface; they must be constructed to retard radiation, preferably by being covered with a heat insulating or non-conducting covering. The result of these changes of proportion and construction is to constitute a substantially different storage radiator from any heretofore known, that is to say, one which has a relatively large instead of relatively small storage capacity; which has a relatively small instead of large radiating surface; and which is adapted to retard instead of to promote the radiation of its stored heat into the car.

My invention therefore provides, as a heating apparatus for cars in the nature of refrigerator cars which have non-conducting walls and are tightly closed during transit, steam heating means in the nature of a radiator or radiators controllable by means of valves or other controlling devices from the exterior of the car, so that the attendant may regulate and control the heating up of the car and stop such heating at the desired period, such means being adapted for rapidly radiating heat into the car to initially warm it to the desired starting temperature, and also adapted for storing a considerable quantity of heat and for radiating such stored heat independently of the initial heating, and so slowly as to keep the car warm for several hours after the steam is cut off, its rate of radiation to this end being such that it will approximately compensate for the loss of heat by radiation from the car while traveling in mild winter weather, thus making its rate of radiation somewhat slower than the rate at which the car loses heat in cold weather. The radiators may be one or more, provided they have the dual capacity stated, namely, that of initially and rapidly radiating heat for warming the car at starting, and for subsequently slowly radiating stored heat for keeping the car warm during transit, or in other words, for retarding its cooling. The two functions may be performed by a single radiator convertible from a heater adapted for rapid radiation to a storage heater adapted for extremely slow radiation; but preferably two separate but connected radiators are provided, the one a direct steam radiator for rapid heating and the other a storage radiator for slow heating. Each car is provided with a train-pipe terminating in hose and couplings at opposite ends for connection with the train-pipes of adjoining cars, in the manner well known for passenger cars. From this train-pipe branches extend to the heaters and are controllable by valves the handles of which extend through the wall or floor of the car, so as to be operable from the exterior. Suitable traps, preferably thermostatic, are provided for draining off the water of condensation from the heaters or from the train-pipe, or both. Inasmuch as the cars are preferably heated after the doors are closed and locked, each car should have one or more thermometers the bulb of which is exposed within the car, and the scale of which is visible from outside the car.

Figure 6:
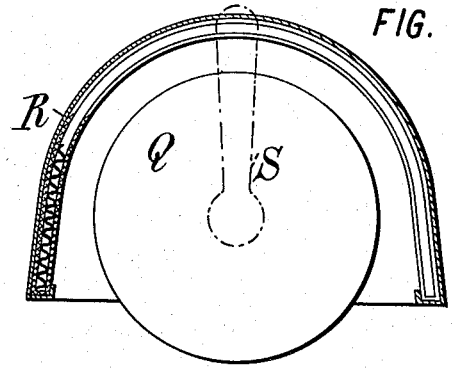
Figure 7:
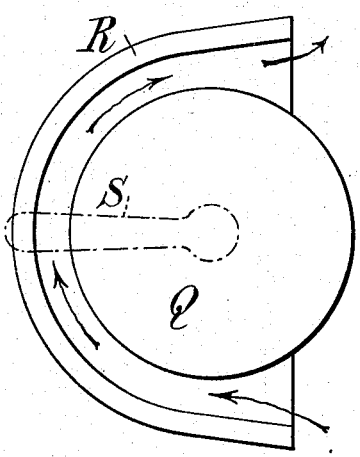
Figure 8:
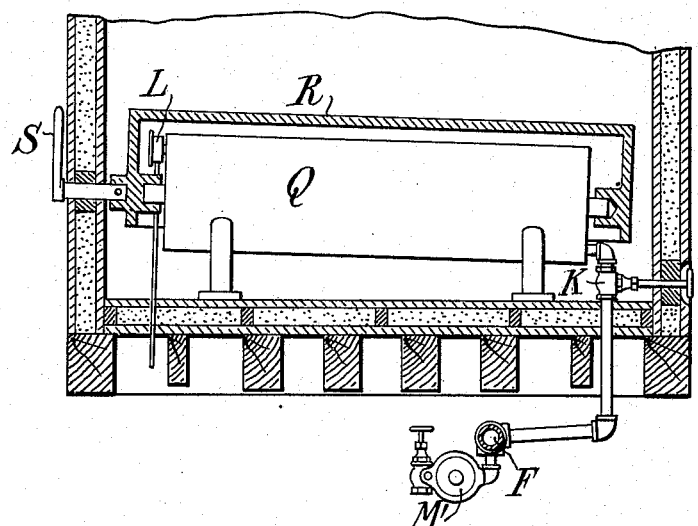
Figure 9:
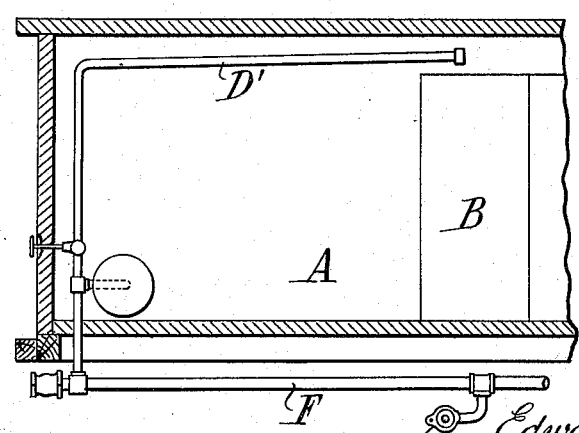

Having now indicated the nature of my invention, I will proceed to describe in detail certain specific embodiments thereof with reference to the accompanying drawings, wherein Figure 1 is a vertical longitudinal section of a refrigerator car showing its heating equipment in elevation on a reduced scale; Fig. 2 is an enlargement of a portion at one end of Fig. 1 showing the heating equipment; Fig. 3 is a horizontal section of one end of a car showing the heating apparatus in plan a portion of the pipes being broken away; Fig. 4 is a vertical cross-section of the car showing the heating apparatus in elevation; Fig. 5 is a fragmentary transverse section of the storage heater; Figs. 6 and 7 are end elevations partly in section of a modified storage heater with a movable insulating hood in two different positions; Fig. 8 is a vertical transverse section corresponding to Fig. 4 and showing a modified construction. Fig. 9 is a fragmentary vertical longitudinal section showing a modified construction.

I will first describe the construction shown in Figs. 1 to 5 inclusive. A indicates the body of the car, which is provided after the usual manner of refrigerator cars with cellular walls of non-heat-conducting character, and with close-fitting doors B B. Preferably at each end of the car there is provided the usual ice box illustrated at C C in Fig. 1, and the bottom grating of which is shown at C' C' in Figs. 1 and 2. In the space beneath this grating is arranged the heating apparatus, which occupies only the same floor space already required for the ice box, and preferably utilizes the latter as a flue for distributing the ascending currents of heated air. This apparatus is shown as comprising a preliminary heater D and a storage heater E. Beneath the car is extended the usual steam train-pipe F, wrapped or covered with non-conducting material in the well known manner, and having the usual hose connections G G and couplings H at its ends. From the train-pipe F lead branch pipes I which ascend into the car and conduct the steam to the respective heaters or radiators. The valve J controls admission of steam to the radiator D, and a valve K controls its admission to the radiator E. Or the latter valve may be omitted and the steam pipe may be in unobstructed communication with the latter radiator. The valves J and K are operated from the exterior of the car by means of handles which project through the wall or floor of the car. Any suitable air valves may be applied to the radiators, such valve being shown at L as applied to the radiator E. Provision is made for draining the water of condensation from the radiators; this may be done by means of any suitable or known construction of traps M M applied to drainage pipes N N descending from the lower ends of the radiators.

The radiator D is a direct-steam heater, and may be in the form of a coil or rack of pipes which are naked or exposed so as to readily radiate heat. The radiator E is a storage heater constructed internally in any suitable or known way adapted to the storage of heat from the steam, and proportioned according to the method already explained to afford the maximum heat storage capacity and the minimum radiating surface consistent with the adaptation of the heater to the space available for it. The radiation is retarded by any suitable wrapping, such as that shown in Fig. 5, where a is the tubular shell of the storage heater, b is a cellular non-conducting wrapping surrounding it, and c is a sheet metal outer covering. In this construction the storage heater has a porous filling d adapted to become saturated with the steam and to serve as the storage medium. For admitting the steam through it, it has a central bore e, and for draining off the water of condensation it has a channel f at the bottom.

In operation, the car having been filled and preferably closed and having been preferably made up in a train with the pipes F F of successive cars connected, steam is admitted from any suitable source, such as any convenient locomotive boiler or a stationary boiler. This connection is usually made at one end of the train, and because of the loss through condensation the cars at that end receive steam more readily than those at the remote end, so that it is preferable to start with all the valves J J closed and to open first those valves at the remote end of the train, opening these valves progressively toward the end nearest the source of steam. The valves K K may all be open, since the radiation from the heaters E E is so slow as to be almost negligible. The attendant watches the thermometers of the successive cars, one of which is shown at P, and as each indicates that the interior of the car has been heated to a prescribed starting temperature, for example 60 degrees, he closes the valve J of such car, thereby shutting off the heat from the direct radiator D, and shortly thereafter arresting the heating up operation. The valves to the heaters E E may be left open. When all the cars have been brought to the desired initial temperature, the steam pipe may be severed from the source of steam and the train started on its journey. Ordinarily the time required to initially heat up the cars is adequate for charging the storage heaters E E, and in fact the radiating surface of the initial heaters D D should be sufficiently limited to insure this result. As the car is traveling it loses heat slowly, so that under given weather conditions its temperature would fall say for example 6 degrees Fahrenheit per hour, were it not for the radiation of the heaters E E; but by reason of the approximate compensation afforded by the heat thus slowly radiated into the car, the actual fall of temperature is diminished to for example 1 or 2 degrees Fahrenheit per hour. If the locomotive hauling the train is not adapted for supplying steam, the valves K K should be closed before starting, or else the steam pipe F should be closed at opposite ends of the train. If however the locomotive is adapted for supplying steam, this may be done intermittently at infrequent intervals in order to recharge the storage heaters E E, and for this purpose the valves K K should be left open. If the system is thus operated, the attendant should examine the thermometers, and steam should be admitted to the storage heaters only of those cars which have reached a sufficiently low temperature, the valves K K of the other cars being kept closed. There is little danger, however, of overheating the cars by steam admitted to the storage heaters only, since the rate of radiation from these is so slow, but in any event care should be taken to avoid the tendency to overheating which occurs in the cars nearest the engine. Operated thus, the surplus steam available when running down grade may be utilized to heat the cars. Otherwise the cars will not be re-heated until some convenient stopping place is found where they can be reconnected to a source of steam, and the original heating up operation be repeated.

Instead of employing separate radiators D and E for the direct-steam heating and for the subsequent storage heating, a single radiator may be adapted for both purposes after the manner indicated in Figs. 6, 7 and 8. In these figures Q is the radiator, which may be internally constructed the same as the storage heater E so as to have considerable heat storage capacity. Its surface, however, instead of being permanently covered by a heat-insulating wrapping, is left naked, and a movable insulating hood R is provided which may be turned to two positions, one of which is shown in Fig. 6, where it covers over the radiator and imprisons the air above it so as to prevent its circulating upwardly, and forms thus a slow-radiating storage heater. Or the hood may be turned a quarter round to the position shown in Fig. 7, where it admits a circulation of air between itself and the heater, as shown by the arrows, and consequently makes the radiator available for rapid radiation for warming up the car. The hood R is connected in any suitable way with a handle S upon the exterior of the car, by which it may be turned for controlling the heater, that is to say, for converting it from a quick-radiating or direct heater, to a slow-radiating storage heater. In the operation of this modified system the steam is admitted as before to the heater Q, its hood R being turned to the position shown in Fig. 7 to promote active radiation for quickly warming up the car; when the car is sufficiently warm the handle S is turned to bring the hood to the position shown in Fig. 6, being suitably locked in position to hold it against displacement; the radiator Q now becomes a storage heater which can radiate the heat only very slowly by the circulation of air beneath the hood R and by the very slow conduction of heat through the hood. The steam admission valve K is controlled exactly as in the first instance. The construction of the heater or heaters may be otherwise modified to similar effect, the essential thing being to provide for a rapid radiation of heat for initially warming the car, and for the subsequent slow radiation of stored heat for suitably retarding the fall of temperature in the car during transit.

Instead of the arrangement of traps M M shown in Fig. 4, the heater may be inclined in the opposite direction and a single trap arranged on the main train pipe F, as shown in Fig. 8, the admission valve K being in this case applied at the lowest point, so that when the valve is opened the water of condensation will drain from the radiator back through the branch pipe I into the pipe F, and thence be discharged through the trap M' applied thereto. With this arrangement a single trap M' will answer for the entire car, in which case the trap could be applied at the middle of the train-pipe F.

Instead of the primary or direct steam radiator being made as a flat coil D, as shown in Figs. 1 to 4, it may be constructed in any other suitable form, the simplest form for such a radiator being a steam pipe extending naked within the car.

Fig. 9 shows a pipe D' extended upward and horizontally within the car to a suitable distance. It is preferably placed where it will occupy the least available room, and should be sloped sufficiently to drain off the condensing steam and direct it back to the train-pipe. This figure also shows a single drainage trap M' applied to the train-pipe F beneath the car.

I claim as my invention:—

1. A car for fruit or other perishable freight having walls of limited or very low conductivity and adapted to be tightly closed to preserve its contents from exposure to the exterior temperature, combined with steam-heating means adapted to act by direct or quick radiation and adapted also to act by storage and slow radiation, and adapted when acting by storage and slow radiation to store a considerable quantity of heat and to radiate it so slowly as to warm the car for several hours after the steam is cut off, and at such a rate as to approximately compensate for the loss of heat in normal winter weather, said steam-heating means being controllable from the exterior of the car, so that without opening the car it may be initially warmed by quick radiation and a quantity of heat stored to be slowly radiated to keep the contents of the car safely above the freezing point for several hours after being severed from the source of steam.

2. A car for fruit or other perishable freight having walls of limited or very low conductivity and adapted to be tightly closed to preserve its contents from exposure to the exterior temperature, combined with steam-heating means adapted to act by direct or quick radiation and adapted also to act by storage and slow radiation, and adapted when acting by storage and slow radiation to store a considerable quantity of heat and to radiate it so slowly as to warm the car for several hours after the steam is cut off, and at a rate approximating but slower than the rate of radiation from the car in normal winter weather, said steam-heating means being controllable from the exterior of the car so that without opening the car it may be initially warmed by quick radiation and a quantity of heat stored to be slowly radiated to keep the contents of the car safely above the freezing point for several hours after being severed from the source of steam.

3. A car for fruit or other perishable freight having walls of limited or very low conductivity and adapted to be tightly closed to preserve its contents from exposure to the exterior temperature, and having steam-heating means comprising a direct-steam radiator for rapidly warming up the car, controllable from the exterior, and a storage radiator of large capacity adapted to radiate its stored heat so slowly as to warm the car for several hours after the steam is cut off, and at such rate as to approximately compensate for the loss of heat by radiation while traveling in normal winter weather, whereby the car may be initially warmed before starting its journey and may travel for several hours in cold weather after being severed from the source of steam, during which time by such slow radiation of the heat its contents are kept safely above the freezing point.

4. A car for fruit or other perishable freight adapted to be tightly closed to preserve its contents from exposure to the exterior temperature, having therein a direct-steam radiator for rapidly warming up the car, and a storage radiator for maintaining the car warm for a long time after the steam is cut off.

5. A car for fruit or other perishable freight adapted to be tightly closed to preserve its contents from exposure to the exterior temperature, and to be sealed to prevent tampering with its contents, having therein steam heating means comprising a direct-steam radiator for rapidly warming up the car, and a storage radiator for maintaining the car warm for a long time after the steam is cut off, and means for controlling the same having its operating handle extending to the exterior of the car.

6. A refrigerator car for fruit or other perishable freight adapted to be tightly closed, said car having a compartment raised above the floor adapted when charged with ice to cool the contents of the car by a free circulation of air between the compartment and the freight space, and steam-heating means arranged within the vertical space occupied by said compartment and adapted to warm the contents of the car by circulation of air through said compartment, and means for controlling said radiator from the exterior of the car.

7. A refrigerator car for fruit or other perishable freight adapted to be tightly closed, said car having a compartment with an open bottom raised above the floor adapted when charged with ice to cool the contents of the car by a free circulation of air between the compartment and the freight space, and steam-heating means arranged within the vertical space occupied by said compartment so that the two occupy the same floor space, and the compartment forms a vertical flue through which the air circulates.

In witness whereof, I have hereunto signed my name in the presence of two subscribing witnesses.

EDWARD E. GOLD.

Witnesses:
ARTHUR C. FRASER,
FRED WHITE.